May 12, 1959    K. MÜNCHBACH    2,886,358
LOCKING MEANS FOR LOCKING WHEELS, PARTICULARLY
GEAR WHEELS, ON DRIVING SHAFTS
Filed Jan. 11, 1954

INVENTOR
KURT MÜNCHBACH
BY:

United States Patent Office 2,886,358
Patented May 12, 1959

2,886,358

LOCKING MEANS FOR LOCKING WHEELS, PARTICULARLY GEAR WHEELS, ON DRIVING SHAFTS

Kurt Münchbach, Pforzheim, Germany, assignor to Fritz Ungerer, Pforzheim, Germany Application January 11, 1954, Serial No. 403,358

Claims priority, application Germany January 12, 1953

3 Claims. (Cl. 287—53)

The present invention relates to a locking device for locking gear wheels or the like in position on a driving shaft.

It is an object of the present invention to provide a locking device which can easily and quickly be brought to a locking position and which can also easily and quickly be removed from such a locking position.

It is a further object of the present invention to provide a locking device which consists only of a few and rugged parts, so that this locking device can be manufactured at a reasonable cost and so that it will stand up during extended use.

With the above objects in view, the present invention mainly consists in a locking device adapted to be mounted on a shaft. The shaft has similar first and second key means thereon spaced axially a predetermined distance from each other. The locking device itself mainly comprises a first mounting member having a circular opening therein with a first key portion corresponding to the key means on the shaft, and a second mounting member having a circular opening therein with a second key portion corresponding to the key means on the shaft. The axial length of one of the key portions is made less than the predetermined distance the first and second key means on the shaft are spaced axially from each other. The locking device includes further connecting means operatively associated with the aforementioned mounting members and preventing axial movement thereof relative to each other and also connecting these mounting members to each other with the openings thereof in axial alignment for turning movement relative to each other between an aligned position wherein the key portions of the mounting members are in alignment with each other and a disaligned position wherein the key portions are out of alignment with each other. The connecting means include an annular groove formed in one of the mounting members and coupling means carried by the other of the mounting members and projecting radially into the annular groove, thereby preventing axial displacement of the mounting members relative to each other while permitting rotation thereof relative to each other. The connecting means further include an arcuate slot formed in one of the mounting members and engaging means carried by the other of the mounting members and projecting axially into this arcuate slot. This slot is so oriented that the mounting members may rotate relative to each other and that when the engaging means abuts against one end of the slot the mounting members are in the aligned position and that when the engaging means abuts against the opposite end of the slots the mounting members are in the disaligned position. The locking device further includes biasing means operatively associated with the mounting members for continuously urging the same into the disaligned position.

The biasing means are preferably in the form of a single spring coil located between the mounting members and connected at opposite ends thereof respectively to the first and second mounting member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
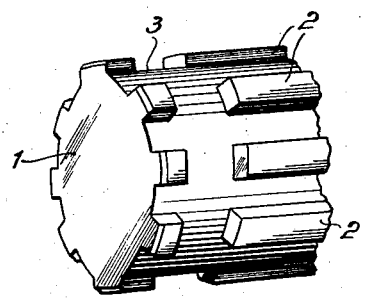
Fig. 1 is a perspective view of the end of a drive shaft on which the locking device of the present invention is used.
Figure 2:
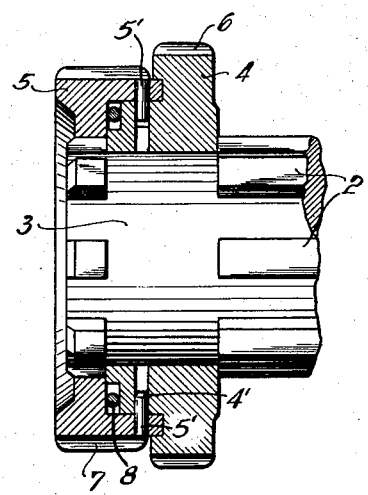
Fig. 2 is a partly sectioned side view of the locking device of the present invention mounted on the end of the drive shaft shown in Fig. 1.
Figure 3:
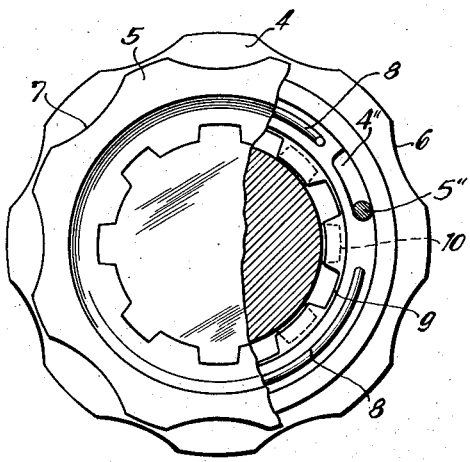
Fig. 3 is a front view of the arrangement shown in Fig. 2 with some portions broken away to show the construction more clearly.
Figure 4:
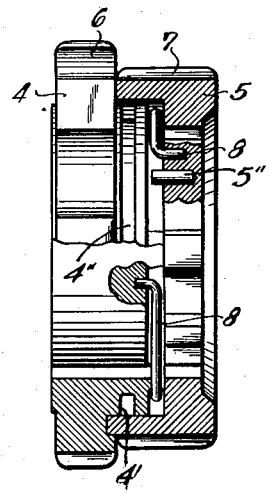
Fig. 4 is a side view of the locking device of the present invention partly in section and showing the locking device removed from the end of the drive shaft.

Referring now to the drawings, and more particularly to Fig. 2, it will be seen that the locking device of the present inveniton consists of two rings or mounting members 4 and 5 which are mounted on the end of a shaft 1. The shaft 1 is a spline shaft provided at least at the end thereof with key means 2 which are divided by a circumferential groove 3 into a first key means located at the end of the shaft 1 and second key means spaced therefrom in axial direction a predetermined distance. The first mounting member 4 is formed with a circular opening formed with spaced, longitudinal extending grooves 10 which form on the inner surface of this mounting member 4 first key portions corresponding to the key means on the shaft 1. The second mounting member 5 is also formed with a circular opening, likewise provided with longitudinally extending, spaced grooves 9 which form on the second mounting member second key portions corresponding to the key means of the shaft 1. The axial length of at least one of the key portions in one of the mounting members is less than the width of the groove 3 in the shaft 1 and in the embodiment illustrated in Fig. 2 the axial length of the key portions 10 in the mounting member 4 as well as the axial length of the key portions 9 in the member 5 are made shorter than the width of the groove 3 in the shaft 1. However, it is also possible to make the length of the key portion in the mounting member 4 longer than the width of the groove 3 in this case the axial length of the key portions in the mounting member 5 have to be made shorter than the width of the groove 3. The mounting members 4 and 5 are provided on the outer periphery thereof with shallow arcuate grooves 6 and 7, respectively, to facilitate gripping and turning of these mounting members. The mounting members 4 and 5 are coupled together by connecting means which include an annular groove 4' formed in one of the mounting members, for instance, as shown, in the mounting member 4, and pin means shown in the drawing as two pins 5' projecting radially through the side wall of the member 5 into the groove 4', thereby preventing axial displacement of the two mounting members relative to each other while permitting rotation of these members relative to each other. The connecting means further include an arcuate slot 4" formed in the mounting member 4 concentric with the circular opening therethrough and a pin 5" carried by the mounting member 5 and projecting in axial direction into the slot 4". The length of the slot 4" is such that when the pin 5" abuts against one end of this slot, the two mounting members are in such a position that the key portions 9 and 10 respectively formed on the mounting members 4 and 5 are in an aligned position and so that when the pin 5″ abuts against the opposite end of the slot 4‴, the key portions 9 and 10 are in disaligned position. Located between the opposing end faces of the mounting members 4 and 5 are biasing means shown in the drawing, in the form of a single spring coil 8, the ends of which are respectively bent substantially at right angles to the remainder of the spring and respectively anchored in axially extending holes formed in the mounting members 4 and 5, respectively. The torsion spring 8 is tensioned to continuously urge the two mounting members into the disaligned position thereof.

The locking device of the present invention will operate as follows:

When a gear wheel or similar member, not shown in the drawing, placed on the shaft 1 has to be locked against removal therefrom, the key portions 10 in the mounting member 4 are brought in alignment with the key means 2 formed on the shaft 1 and then the two mounting members 4 and 5 are pushed in axial direction of the shaft 1 towards the right as viewed in Fig. 2. During this movement of the two mounting members towards the right the mounting member 5 is turned against the action of the spring 8 in such a manner that the key portions 9 formed in the mounting member 5 will also be brought into alignment with the key means 2 on the shaft 1. When the two mounting members are pushed toward the right, as viewed in Fig. 2 until they come into the position as shown in Fig. 2, the mounting member 4 is free to turn in the groove 3 relative to the mounting member 5 and the spring 8 will turn the mounting member 4 relative to the mounting member 5. The key portions 9 engaging the key means 2 formed on the shaft 1 prevent the member 5 from turning, and the pins 5″ of the member 5 engaging into the arcuate groove 4″ formed in the member 4 will limit the turning movement of the mounting member 4 relative to the mounting member 5 in such a way that the key portions formed on the member 4 will be disaligned with respect to the key means formed in the shaft 1 and the mounting members 4, 5 will therefore be locked on the shaft 1. In order to remove the locking device again from the shaft, the mounting member 4 has to be turned against the force of the spring 8 until the key portions on the mounting member 4 are again in alignment with the key means on the shaft 1, and then the two mounting members may be pushed in axial direction towards the left as viewed in Fig. 2, and removed from the shaft.

As mentioned before, the key portions in one of the mounting members can also be made longer than the width of the groove 3 formed in the shaft 1. The operation of such a device will be slightly different from the operation described above. In this case the member with the long key portion is pushed first onto the shaft with its key portions thereof aligned with the key means on the shaft and in this case this member can be pushed beyond the groove 3 without being turned relative to the other mounting member pushed onto the shaft with its key portion aligned with the key means of the shaft. The two mounting members are pushed in this case towards the right, as viewed in Fig. 2, until the key portions on the mounting member 5 leave the first key means on the shaft formed at the end thereof. At this moment the spring 8 will turn the mounting member 5 relative to the mounting member 4 which in turn is held on the shaft by the key portions 10 in engagement with the second key means on the shaft 1. Pin 5″ in the arcuate slot 4″ will again limit the rotation of the mounting member 5 relative to the mounting member 4 and relative to the key means 2 formed on the shaft 1 so that the key portions 9 on the mounting member 5 are in disalignment with the key means on the shaft so that the two mounting members 4 and 5 are locked against longitudinal removal from the shaft. If removal of the locking device is desired, then the mounting member 5 is turned against the force of the spring 8 until the key portions thereon are brought into alignment with the key means on the shaft so that the device can be pulled off towards the left, as viewed in Fig. 2, from the shaft 1. In this case the outer of the two mounting members, that is the mounting member 5 located adjacent the shaft end has to be turned which may be of advantage when only limited space is available for the operation of the locking device.

It will be understood that each of the elements described above, or two or more together, may also find a useful application in other types of locking devices differing from the types described above.

While the invention has been illustrated and described as embodied in a locking device for locking gear wheels or similar members on a drive shaft, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A locking device adapted to be mounted on a shaft, said shaft having similar first and second key means thereon spaced axially a predetermined distance from each other comprising, in combination, a first mounting member having a circular opening therein with a first key portion corresponding to the key means on the shaft; a second mounting member having a circular opening therein with a second key portion corresponding to the key means on the shaft, the axial length of one of said key portions being less than said predetermined distance; connecting means operatively associated with said mounting members and preventing axial movement thereof relative to each other and connecting said mounting members to each other with said openings thereof in axial alignment for turning movement relative to each other between an aligned position wherein said key portions of said mounting members are in alignment with each other and a disaligned position wherein said key portions are out of alignment with each other, said connecting means including an annular groove formed in one of said mounting members, and pin means carried by the other of said mounting members and projecting radially into said annular groove, thereby preventing axial displacement of said mounting members relative to each other while permitting rotation of said members relative to each other, said connecting means further including an arcuate slot formed in one of said mounting members concentric with the circular openings therethrough and a pin carried by the other of said mounting members and projecting into said arcuate slot, said slot having a length so that when said pin abuts against one end of said slot said mounting members are in said aligned position and so that when said pin abuts against the opposite end of said slot said mounting members are in said disaligned position; and spring means formed by a single spring coil located between said mounting members and connected at opposite ends thereof respectively to said first and said second mounting member for continuously urging said mounting members into said disaligned position thereof.

2. A locking device adapted to be mounted on a shaft, said shaft having similar first and second key means thereon spaced axially a predetermined distance from each other, comprising, in combination, a first mounting member having a circular opening therein with a first key portion corresponding to the key means on said shaft; a second mounting member having a circular opening therein with a second key portion corresponding to the key means on the shaft, the axial length of one of said key portions being less than said predetermined distance; connecting means operatively associated with said mounting members and preventing axial movement thereof relative to each other and also connecting said mounting members to each other with said openings thereof in axial alignment for turning movement relative to each other between aligned position wherein said key portions of said mounting members are in alignment with each other and a disaligned position wherein said key portions are out of alignment with each other, said connecting means including an annular groove formed in one of said mounting members and coupling means carried by the other of said mounting members and projecting radially into said annular groove, thereby preventing axial displacement of said mounting members relative to each other while permitting rotation of said members relative to each other, said connecting means further including an arcuate slot formed in one of said mounting members and engaging means carried by the other of said mounting members and projecting axially into said arcuate slot, said slot being so oriented that said mounting members may rotate relative to each other and that when said engaging means abuts against one end of said slot said mounting members are in said aligned position and that when said engaging means abuts against the opposite end of said slot said mounting members are in said disaligned position; and biasing means operatively associated with said mounting members for continuously urging the same into said disaligned position.

3. A locking device as defined in claim 2 wherein the axial length of the other of said key portions is greater than said predetermined distance.

References Cited in the file of this patent

UNITED STATES PATENTS

| | | |
|---|---|---|
| Re. 13,425 | Blossom | June 11, 1912 |
| 710,240 | Belfield et al. | Sept. 30, 1902 |
| 1,391,633 | Hazelton | Sept. 20, 1921 |
| 1,825,410 | Monckmeier | Sept. 29, 1931 |
| 2,084,431 | Cately | June 22, 1937 |
| 2,441,624 | Elliott | May 18, 1948 |